United States Patent
Vernon et al.

(10) Patent No.: US 10,778,456 B1
(45) Date of Patent: *Sep. 15, 2020

(54) METHODS AND APPARATUS FOR AUTOMATICALLY ADDING A MEDIA COMPONENT TO AN ESTABLISHED MULTIMEDIA COLLABORATION SESSION

(71) Applicant: OPEN INVENTION NETWORK LLC, Durham, NC (US)

(72) Inventors: Todd Vernon, Lafayette, CO (US); Dan Jones, Niwot, CO (US)

(73) Assignee: OPEN INVENTION NETWORK LLC, Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/106,841

(22) Filed: Aug. 21, 2018

Related U.S. Application Data

(63) Continuation of application No. 15/421,748, filed on Feb. 1, 2017, now Pat. No. 10,057,075, which is a
(Continued)

(51) Int. Cl.
  *G06F 15/16* (2006.01)
  *H04L 12/18* (2006.01)
  (Continued)

(52) U.S. Cl.
  CPC ......... *H04L 12/1827* (2013.01); *G06Q 10/10* (2013.01); *H04L 29/06* (2013.01); *H04L 65/1069* (2013.01); *H04L 65/1083* (2013.01); *H04L 65/403* (2013.01); *H04L 65/4038* (2013.01); *H04L 67/14* (2013.01); *H04N 7/15* (2013.01); *H04L 29/06027* (2013.01)

(58) Field of Classification Search
  None
  See application file for complete search history.

(56) References Cited

U.S. PATENT DOCUMENTS

| 5,148,429 A | 9/1992 | Kudo et al. |
| 5,359,598 A | 10/1994 | Steagall et al. |

(Continued)

FOREIGN PATENT DOCUMENTS

| DE | 19717167 A1 | 10/1998 |
| EP | 0622931 A2 | 11/1994 |

(Continued)

OTHER PUBLICATIONS

"Interactive Remote Recording and Playback of Multicast Video Conferences" W. Holfelder (1998).
(Continued)

*Primary Examiner* — Mohamed Ibrahim

(57) ABSTRACT

A multimedia collaboration system that facilitates more efficient, free-flowing collaboration sessions. In order to make addition of new participants, media components, and or network access device to a collaboration session more efficient, client devices associated with each participant can store endpoint address information that can be automatically obtained by the multimedia collaboration system. The endpoint address information can then be used to add the new participants, media components, and or network access device.

20 Claims, 8 Drawing Sheets

Related U.S. Application Data continuation of application No. 14/700,532, filed on Apr. 30, 2015, now Pat. No. 9,565,219, which is a continuation of application No. 14/308,553, filed on Jun. 18, 2014, now Pat. No. 9,037,651, which is a continuation of application No. 10/776,459, filed on Feb. 10, 2004, now Pat. No. 8,775,511.

(60) Provisional application No. 60/445,778, filed on Feb. 10, 2003.

(51) Int. Cl.
    *H04L 29/08*     (2006.01)
    *H04L 29/06*     (2006.01)
    *H04N 7/15*     (2006.01)
    *G06Q 10/10*     (2012.01)

(56) References Cited

U.S. PATENT DOCUMENTS

| | | |
|---|---|---|
| 5,440,699 A | 8/1995 | Farrand et al. |
| 5,483,587 A | 1/1996 | Hogan et al. |
| 5,483,588 A | 1/1996 | Eaton et al. |
| 5,530,795 A | 6/1996 | Wan |
| 5,559,875 A | 9/1996 | Bieselin et al. |
| 5,583,993 A | 12/1996 | Foster et al. |
| 5,608,426 A | 3/1997 | Hester |
| 5,608,872 A | 3/1997 | Schwartz et al. |
| 5,617,423 A | 4/1997 | Li et al. |
| 5,619,554 A | 4/1997 | Hogan et al. |
| 5,623,603 A | 4/1997 | Jiang et al. |
| 5,634,018 A | 5/1997 | Tanikoshi et al. |
| 5,649,104 A | 7/1997 | Carleton et al. |
| 5,668,863 A | 9/1997 | Bieselin et al. |
| 5,706,502 A | 1/1998 | Foley et al. |
| 5,742,670 A | 4/1998 | Bennett |
| 5,745,711 A | 4/1998 | Kitahara et al. |
| 5,748,898 A | 5/1998 | Ueda |
| 5,754,765 A * | 5/1998 | Danneels ............... G06T 1/00 348/E7.083 |
| 5,754,830 A | 5/1998 | Butts et al. |
| 5,761,419 A | 6/1998 | Schwartz et al. |
| 5,764,901 A | 6/1998 | Skarbo et al. |
| 5,778,368 A | 7/1998 | Hogan et al. |
| 5,781,909 A | 7/1998 | Logan et al. |
| 5,786,814 A | 7/1998 | Moran et al. |
| 5,790,637 A | 8/1998 | Johnson et al. |
| 5,809,247 A | 9/1998 | Richardson et al. |
| 5,809,250 A | 9/1998 | Kisor |
| 5,812,652 A | 9/1998 | Jodoin et al. |
| 5,819,243 A | 10/1998 | Rich et al. |
| 5,844,979 A | 12/1998 | Raniere et al. |
| 5,859,974 A | 1/1999 | McArdle et al. |
| 5,894,556 A | 4/1999 | Grimm et al. |
| 5,907,324 A | 5/1999 | Larson et al. |
| 5,913,062 A | 6/1999 | Vrvilo et al. |
| 5,916,302 A | 6/1999 | Dunn et al. |
| 5,930,238 A | 7/1999 | Nguyen |
| 5,930,473 A | 7/1999 | Teng et al. |
| 5,933,417 A | 8/1999 | Rottoo |
| 5,940,082 A | 8/1999 | Brinegar et al. |
| 5,944,791 A | 8/1999 | Scherpbier |
| 5,951,652 A | 9/1999 | Ingrassia, Jr. et al. |
| 5,953,506 A | 9/1999 | Kalra et al. |
| 5,978,756 A | 11/1999 | Walker et al. |
| 5,978,835 A | 11/1999 | Ludwig et al. |
| 5,986,655 A | 11/1999 | Chiu et al. |
| 5,990,933 A | 11/1999 | Ozone et al. |
| 5,991,276 A | 11/1999 | Yamamoto |
| 5,995,606 A | 11/1999 | Civanlar et al. |
| 5,995,951 A | 11/1999 | Ferguson |
| 5,999,977 A | 12/1999 | Riddle |
| 6,018,774 A | 1/2000 | Mayle et al. |
| 6,029,127 A | 2/2000 | Delargy et al. |
| 6,049,602 A | 4/2000 | Foladare et al. |
| 6,061,440 A | 5/2000 | Delaney et al. |
| 6,061,717 A | 5/2000 | Carleton et al. |
| 6,072,463 A | 6/2000 | Glaser |
| 6,100,882 A | 8/2000 | Sharman et al. |
| 6,151,621 A | 11/2000 | Colyer et al. |
| 6,157,401 A | 12/2000 | Wiryaman |
| 6,158,903 A | 12/2000 | Schaeffer et al. |
| 6,181,786 B1 | 1/2001 | Detampel et al. |
| 6,192,394 B1 | 2/2001 | Gutfreund et al. |
| 6,237,025 B1 | 5/2001 | Ludwig et al. |
| 6,240,444 B1 | 5/2001 | Fin et al. |
| 6,263,365 B1 | 7/2001 | Scherpbier |
| 6,295,551 B1 | 9/2001 | Roberts et al. |
| 6,301,258 B1 | 10/2001 | Katseff et al. |
| 6,310,941 B1 | 10/2001 | Crutcher et al. |
| 6,335,927 B1 | 1/2002 | Elliott et al. |
| 6,343,313 B1 | 1/2002 | Salesky et al. |
| 6,381,568 B1 | 4/2002 | Supplee et al. |
| 6,411,988 B1 | 6/2002 | Tafoya et al. |
| 6,430,176 B1 | 8/2002 | Christie |
| 6,437,818 B1 | 8/2002 | Ludwig et al. |
| 6,463,038 B1 | 10/2002 | Wilson |
| 6,477,176 B1 | 11/2002 | Hämäläinen et al. |
| 6,542,936 B1 | 4/2003 | Mayle et al. |
| 6,598,074 B1 | 7/2003 | Moller et al. |
| 6,640,241 B1 | 10/2003 | Ozzie et al. |
| 6,728,784 B1 | 4/2004 | Mattaway |
| 6,785,244 B2 | 8/2004 | Roy |
| 7,000,019 B2 | 2/2006 | Low et al. |
| 7,283,519 B2 | 10/2007 | Girard |
| 7,313,593 B1 | 12/2007 | Pulito et al. |
| 7,334,017 B2 | 2/2008 | Hawkes et al. |
| 7,627,629 B1 | 12/2009 | Wu et al. |
| 7,653,735 B2 | 1/2010 | Mandato et al. |
| 8,250,141 B2 | 8/2012 | Xiao et al. |
| 8,868,909 B2 | 10/2014 | Mishra et al. |
| 2002/0076025 A1 | 6/2002 | Liversidge et al. |
| 2002/0091832 A1 | 7/2002 | Low et al. |
| 2002/0120686 A1 | 8/2002 | Schell et al. |
| 2002/0124051 A1* | 9/2002 | Ludwig ............... G06Q 10/10 709/204 |
| 2002/0150226 A1 | 10/2002 | Gallant et al. |
| 2002/0176404 A1 | 11/2002 | Girard |
| 2002/0184373 A1 | 12/2002 | Maes |
| 2002/0188744 A1 | 12/2002 | Mani |
| 2002/0196741 A1 | 12/2002 | Jaramillo et al. |
| 2002/0199203 A1 | 12/2002 | Duffy et al. |
| 2003/0055899 A1 | 3/2003 | Burger et al. |
| 2003/0105820 A1 | 6/2003 | Haims et al. |
| 2003/0135552 A1 | 7/2003 | blackstock et al. |
| 2004/0034723 A1* | 2/2004 | Giroti ............... H04L 12/1822 710/8 |
| 2004/0141508 A1 | 7/2004 | Schoeneberger et al. |
| 2004/0246332 A1 | 12/2004 | Crouch |
| 2005/0097440 A1 | 5/2005 | Lusk et al. |

FOREIGN PATENT DOCUMENTS

| | | |
|---|---|---|
| EP | 0779735 A2 | 6/1997 |
| EP | 0874323 A2 | 10/1998 |
| EP | 0908824 A2 | 4/1999 |
| WO | 9926153 A2 | 5/1999 |
| WO | 0022802 A2 | 4/2000 |
| WO | 0056050 A1 | 9/2000 |
| WO | 0169418 A1 | 9/2001 |

OTHER PUBLICATIONS

Hao MC et al, "Collaborative Computing: A Multi-Client Multi-Server Environment", Conference on Organizational Computing Systems, Milpitas, CA, Aug. 123-16, 1995 Comstock N; Ellis C (EDS) pp. 206-213, XP000620968.

Jacobs, S., et al., "Filling HTML Forms Simultaneously: CoWeb-Architecture and Functionality," Computer Networks and ISDN Systems 28(11): 1385-1395 (1996).

(56) References Cited

OTHER PUBLICATIONS

Kazutoshl, Maeno et al., Distributed Desktop Conferencing System (Mennald) Based on Group Communication Architecture,• Ielce Transactions, Institute of Electronics Information and comm., Tokyo, Japan, vol. E74, No. 9, Sep. 1, 1991.

Moralee D., "Scientific Graphics and Visualization Come to the Internet", Scientific Computing World, Mar. 1, 1995, p. 31, 33/34, 36 XP000571217 *p. 34, '2: The Internet carries videoconferencing MICE across Europe*.

Odlyzko, P., et al., "Variable Rate Block Encoding and Adaptive Latency Control for Packet Voice Communications," Motorola Technical Developments, Motorola Inc. pp. 23:48-55 (1994).

Proceedings of the Conference on Emerging Technologies and Applications vol. 1 1996 pp. 60-63. Vetter, RJ; Junalacada, C. "A Multimedia System for Asynchronous Collaboration".

Universal Internet Conference Information System, H. Abdel-Wahab, I. Stoica, F. Sultan Informatics and Computer Science 1996.

\* cited by examiner

FIG. 2

METHODS AND APPARATUS FOR AUTOMATICALLY ADDING A MEDIA COMPONENT TO AN ESTABLISHED MULTIMEDIA COLLABORATION SESSION

RELATED APPLICATION INFORMATION

This application is a continuation of U.S. patent application Ser. No. 15/421,748, filed on Feb. 1, 2017, entitled "Methods and Apparatus for Automatically Adding A Media Component to an Established Multimedia Collaboration Session", issued as U.S. Pat. No. 10,057,075 on Aug. 21, 2018, which is a continuation of U.S. patent application Ser. No. 14/700,532, filed on Apr. 30, 2015, entitled "Methods and Apparatus for Automatically Adding A Media Component to an Established Multimedia Collaboration Session", which issued as U.S. Pat. No. 9,565,219 on Feb. 7, 2017, which is a continuation of U.S. patent application Ser. No. 14/308,553, filed on Jun. 18, 2014, entitled "Methods and Apparatus for Automatically Adding A Media Component to an Established Multimedia Collaboration Session", which issued as U.S. Pat. No. 9,037,651 on May 19, 2015, which is a continuation of U.S. patent application Ser. No. 10/776,459, filed on Feb. 10, 2004, entitled "Method and Apparatus for Automatically Adding a Media Component to an Established Collaboration Session,", which issued as U.S. Pat. No. 8,775,511 on Jul. 8, 2014, which is a non-provisional of U.S. Patent Application Ser. No. 60/445,778, filed on Feb. 10, 2003, entitled "Method and apparatus for automatically adding a media component to an established collaboration session," both of which are incorporated herein in their entirety as if set forth in full.

FIELD OF THE INVENTION

This invention relates generally to the control of a multiparty conference session, and in particular, to adding new media components to an established multimedia collaboration session.

BACKGROUND

In the course of conducting activities involving multiple parties, a need often arises for people to meet to share information, exchange data or documents, discuss topics of mutual interest, or collaborate in preparing various documents or other work product. It may not be desirable, or possible, for all of the participants in a meeting to be in the same physical location at the same time, in which case meeting objectives may be achieved using various communication equipment and networks as tools for facilitating remote collaboration in a multimedia collaboration session, such as a multiparty conference session. It can be useful for such a session to include a variety of media types that include the participants' voices, video images, shared documents, text messages, drawings, computer screen images, etc.

Several systems exist for configuring various devices and networks into collaboration sessions. For example, multimedia collaboration systems require many components and resources such as server equipment, networking equipment, and media processing and distribution. Session participants may be distributed in a wide variety of locations, e.g., in the same building, multiple buildings, across a city, across a country, or internationally. Thus, the communication links between participants vary greatly in quality, bandwidth, and usage cost.

Conventional multimedia collaboration architectures can be divided into two basic architectures: central-server and peer-connected. In a central-server architecture, all participant clients communicate with a single server that performs control, routing, and media processing functions. The server is located at a point in the network topology that is often not optimal for a given session's participants. In addition, a central server architecture provides all media services from a single point in the network, preventing separation of media services and further preventing location of specific media services at optimal points in the network. In a peer-connected architecture, participant clients communicate directly with one another.

There are several roles for participants in a collaboration session. One role can be that of a moderator or chair of the collaboration session. A moderator can, for example, initiate and/or control the collaboration session. Another role can be that of a presenter or speaker. A participant who is in a presenter role can have the ability to make presentations, e.g., in audio and/or video format, during the collaboration session. Another role can be that of a viewer. A participant who is in a viewing role can have the ability to review and/or hear the presentations made by whichever participant is presenting at that time. A collaboration session can include one or more participants, each of which can participate in any number of these roles.

Privileges or permissions can be established for various participants and/or roles for a collaboration session. Particular privileges or permissions can be repeated or reused for the participants and/or roles in successive collaboration sessions. The privileges can be referred to as rules as well. The privileges determine the activities and the manner in which participants can participate in a collaboration session.

As discussed above, typically one of the participants in a collaboration session is a moderator. The moderator can have different privileges than the other participants in the collaboration session. For example, the moderator can initiate and/or control the collaboration session. In some systems, the moderator can grant permission to other participants in the session to become presenters.

In some conventional collaboration sessions, various media types can be needed for the session. Media types can be referred to alternatively as media components. Sometimes the media component needs may change during a session. Other times, a need may arise during on ongoing session to add a new media component. In one embodiment, the new media component to be added may involve a separate network, such as the public switched telephone network ("PSTN").

An example of an addition of a new media component is the addition of a telephone conference to an Internet-based data collaboration session that is in progress. In some cases, a different device is used to access the separate network. Also, the separate network can use a different addressing scheme, and there is often no association or common storage of the two network addresses.

Another example of an addition of a new media component is the addition of a telephone-based audio conference to an ongoing multimedia collaboration session that does not include any audio component. Thus, new devices, such as telephones. that operate over a separate network must be added to the collaboration session. The telephone network used to facilitate the telephone-based audio conference can be: (a) separate from the computer network, e.g., Internet; (b) uses separate access devices, e.g. desk telephones; and (c) uses a different addressing scheme, e.g. telephone numbers vs. IP addresses.

In some conventional collaboration systems, the addition of such a conference component requires that a list of endpoint addresses associated with devices used to access the separate network, such as telephone numbers, be entered manually. In many cases, one endpoint address is added for each participant to be added to the new conference component. The endpoint addressees can be transferred to a conferencing subsystem that establishes a connection to the endpoint, e.g., telephone, associated with each of the new endpoint addresses. The conferencing subsystem can be configured to connect the endpoints into the an existing collaboration session.

Some conventional collaboration systems, therefore, require each participant to enter the participant's endpoint address for each collaboration session. Other systems require all endpoint addresses to be entered by a single participant, such as a moderator or chair. Manual entry of such endpoint address information for each session introduces delay in the setting up of a session and increases the potential for mistakes in the entry of the information. Further, if endpoint addresses are to be entered by a single participant, that participant must know or obtain the addresses of all other participants, which can be inconvenient. Additionally, any endpoint address information that is stored in a central database or in one person's address book may become out-of-date and is difficult to update when any address changes.

SUMMARY OF THE INVENTION

A multimedia collaboration system that facilitates more efficient, free-flowing collaboration sessions. In order to make addition of new participants, media components, and or network access device to a collaboration session more efficient, client devices associated with each participant can store endpoint address information that can be automatically obtained by the multimedia collaboration system. The endpoint address information can then be used to add the new participants, media components, and or network access device.

These and other features, aspects, and embodiments of the inventions are described below in the section entitled "Detailed Description of the Preferred Embodiments."

BRIEF DESCRIPTION OF THE DRAWINGS

FIG. 2 is a schematic view of an embodiment of a user profile according to the present invention.

DETAILED DESCRIPTION OF THE INVENTION

Figure 1:
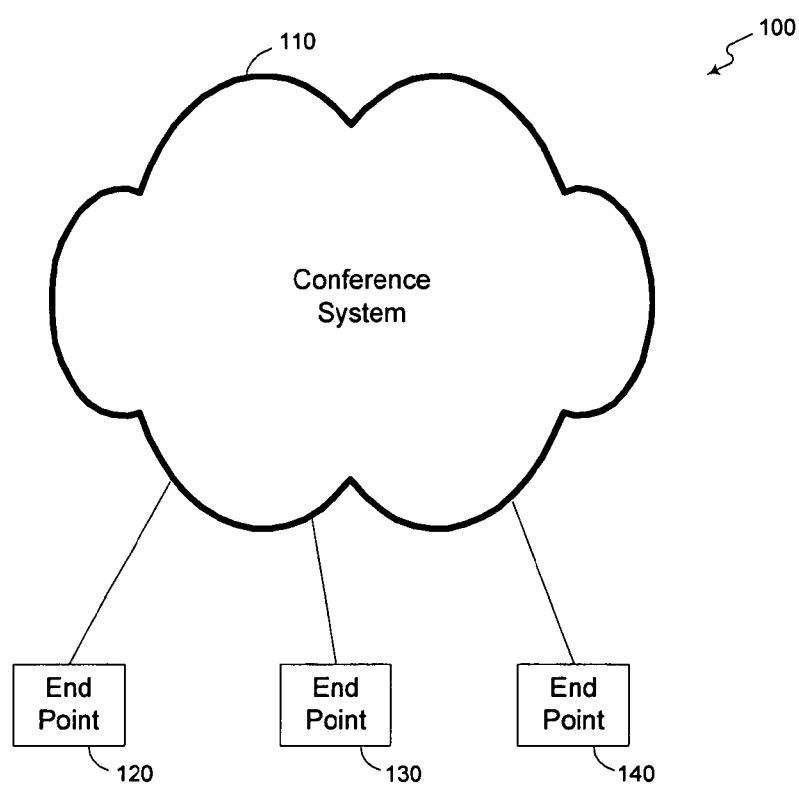
FIG. 1 is a schematic view of an embodiment of a system for a collaboration session.

Several embodiments are discussed in detail below. While specific implementations are discussed in the context of a multiparty conference session, it should be understood that this is done for illustration purposes only. It will be apparent that the systems and methods described herein can be applied to any multimedia collaboration session or system.

The term "collaboration session" is meant to include any meeting in which several people or parties can communicate using data sent via connections established using shared electronic networks, i.e., intranet, Internet, or the like. Such a meeting can also be referred to by various terms, including a conference, a multimedia conference, a conference session, a multimedia collaboration session, and a multiparty conference session.

Multimedia collaboration sessions provide a convenient, low-cost solution for allowing individuals from various geographic locations to conduct a meeting by having discussions and sharing documents, such as drawings and slides, using common desktop devices such as personal computers and telephones. The distances between a local multimedia client device and a remote multimedia client device can range from adjacent desks to distant remote locations. Participants in a collaboration session can share and collaborate in the preparation of documents stored on a particular user's device, such as a local computer, because the device can be the same device as, or networked to, the device used in the collaboration session.

The term "participant" includes any person who is connected to a particular collaboration session and/or has the ability to communicate on a particular collaboration session or who receives a stream of data from a collaboration session. The data stream from a collaboration session can include audio data and/or video data as well as various types of media components such as presentation slides, video files, audio files, electronic documents, drawings, and instant messages.

The term "endpoint address" is used for any information that uniquely identifies a service, location, or device on a network or other system. The endpoint address information can be used to connect devices to a particular device. Some examples of endpoint address information include an internet protocol (IP) address for a computer or client device, a uniform resource locator (URL) for a website, and a telephone number.

A multimedia collaboration system configured in accordance with the systems and methods described herein can be configured to facilitate the collection of endpoint address information for each participant. Such a multimedia collaboration system can also be configured to automate the gathering of endpoint address information for a collaboration session. In one embodiment, for example, a multimedia collaboration system can include a client software application with a mechanism for a user to enter, view and/or edit endpoint address information. This endpoint address information can then be made available to remote devices for purposes of initiating connections. The endpoint address information entered can be stored by the application. Accordingly, in such embodiments, the information needs to be entered only once and can be easily updated when it changes. The benefit is of course that the address information need only be entered once, and not every time a new media connection is established. Another benefit is each participant's endpoint address information is maintained locally by each participant and is thus more likely to be up-to-date.

Collection of the endpoint address information can be handled in several ways. For example, in one embodiment, the collaboration system can automate the retrieval of the endpoint address information upon receiving a proper request. Once the endpoint information is retrieved, the information can then be forwarded to the requesting system or device using any type of connection, such as a network connection. In an alternative embodiment, endpoint address information for a participant can be gathered into a bundle at the start of the meeting. The endpoint address information can then be supplied to a conference service upon joining the conference. In this embodiment, client software residing on the client device associated with each participant can be configured to send a package of endpoint address information at the onset of the conference session that associated services use when a new media type is added.

Depending on the embodiment, endpoint address information for a plurality of endpoints associated with a participant can be stored at the participant's client device. Each endpoint address can, for example, be associated with a different network, device or media type. The automatic retrieval and response mechanism can include a mechanism or protocol to select the appropriate endpoint address information from the participant's client device based on a particular request.

In one embodiment, the endpoint address information can be structured as a list of addresses for a given participant and network, or device type. In such a case, if the initiation of a contact using one endpoint address fails, other endpoint addresses in the list can be used to establish the connection. For example, a list can be created that comprises a plurality of phone numbers, such as an office phone number, a mobile phone number, and a home phone number, all associated with the same specific participant.

It can be appreciated that any type of search program, method or software can be used to select among the endpoint addresses in a particular list. For example, such a search can be conducted using the time of day, the day of the week, any user preferences, and priority ordering. Thus, when structuring the list, each participant can be requested to provide further information by which to prioritize the information in the list.

A mechanism that can be used to detect and determine whether a connection attempt has succeeded or failed can also be included in a multimedia collaboration system configured in accordance with the systems and methods described herein. Any known mechanism or methodology can be used, such as counting rings or asking a user to press a key to discriminate between humans and answering machines.

Further, a participant can have different endpoint address information stored on client devices at different locations. For example, home and office client software could have home and office telephone numbers stored, respectively. In fact, the entire profile for a particular device and/or location can differ even for the same user. i.e., the profile information does not necessarily need to be user specific, but can also be device and location specific. In this example, the connection initiated via the separate network can use the particular endpoint address associated with the desired client software location.

The steps of collecting an endpoint address information from each participant and subsequently establishing a connection to an endpoint using the collected endpoint address information can be performed in any time relation manner with respect to each other. These steps can, for example, be performed sequentially, overlapped to some degree, or performed simultaneously, i.e., in parallel, for one or more participants in a collaboration session. Simultaneous execution of these steps is, however, a much faster establishment of a connection to all participants, particularly in situations where device capabilities and network bandwidth can support these steps.

A multimedia collaboration session can for example be hosted in a multimedia collaboration system, such as that described in related, co-pending U.S. Utility patent application Ser. No. 10/676,899, entitled "System and Architecture for a Multimedia Collaboration Session," filed Sep. 30, 2003. In such a system, a multimedia collaboration system can be implemented using a collection of central servers, where each server handles a specific media type. Thus, when a participant wants to join a conference, he can access the conference using his client device and supplying a conference ID. If a conference session associated with the conference ID exists, then a control channel can be established with the participant's client device and he can be added to the conference session. If such a conference session does not exist, then a new conference session can be created and the participant can be added to the new conference session once a control channel is established.

Once a plurality of participants have joined the conference session, they can then engage in a multimedia collaboration session using the various features and functions made available by the multimedia collaboration system. For example, various media can be shared between participants in the session. Sharing media can comprise the central server that handles a specific media type establishing a media channel with each participant so that the specific media type can be shared with each participant.

Certain media type can, however, require a different network, or client device. For example, when participants are sharing slides via a network connection, a participant or coordinator can determine that it is necessary to add a telephone audio component to the session. Thus, a media channel will need to be established with each participant's telephone via a telephone network. A central audio conference server can be configured to establish telephone connection with each participant using telephone numbers acquired as part of the endpoint address information obtained from each participant. In other words, the collected telephone numbers can be sent to the central audio conference server or bridge, which can be configured to use a "dial-out" mechanism to initiate a connection to the telephone of each participant.

Once a connection is made to a participant, that participant is connected into a telephone conference. If all of the participants have entered correct telephone information, then all of the participants' telephones or other communication devices are called almost immediately after a request that a telephone conference component be added to the session. Each participant is then in conference with the other participants upon answering his telephone or other communication device.

In another embodiment, participants may wish to add a video component to a collaboration session. In one embodiment, a video server receives endpoint address information for the client device used by each participant to receive video. Video connections are then established with each participants video client device via the video server. Alternatively, video streams can be sent between participant client devices, also referred to as peers, without a central server. In such an embodiment, each participant's client software can query the software of the other participants to determine the appropriate endpoint, network, and address information to use for a video connection. Thus, the present invention is not limited to any specific collaboration architecture, but applies to central-server, peer-to-peer, or hybrid systems.

In one embodiment, a control mechanism for the system is located in client software on each participant's client device. The control mechanism allows the entering, storing and/or recalling upon a request from a remote server telephone or other contact information.

An exemplary embodiment of a collaborative communication system 100 configured in accordance with the systems and methods described herein is illustrated in FIG. 1. Here, system 100 includes a conference system 110 and several end points 120, 130, and 140. Conference system 120 can be any type of conference system and can include any arrangement of components. In one implementation, conference system 120 can include several relay servers, a presence service, a conference service and one or more conference objects. Each of end points 120, 130 and 140 can be any type of communication device. For example, an end point can be a telephone or other communication device, a client device such as a personal computer, a server, etc.

Some conventional conference systems allow the addition of participants during an existing conference session. For example, in a teleconference, a moderator can dial out to a particular participant to add that participant to an existing session. When the moderator dials out to a particular participant, the information that the moderator typically uses is the information that the moderator has in his or her possession. But this type of arrangement can be inefficient, since the moderator may have outdated information, thereby making the addition of participants to an existing conference session difficult.

In a multimedia collaboration system configured in accordance with the systems and methods described herein, however, a participant can enter endpoint address information into their own client device, and this information can then automatically be obtained by the system and distributed as required. Thus, accurate information is much more likely. In addition, hierarchies or priorities can be assigned to endpoint information to further ensure that each participant is connected as required.

In one embodiment, each participant can fill out a profile that includes information about the participant. The profile can be retained for future use. For example, each participant's profile can be stored on the client device of the particular participant. When a participant requests to join a session, the join request can be broadcast to all participants already in the session. In one embodiment, each participant has the capability to select some or all elements of his profile and contact information to be broadcast or published to the other participants in the session. Thus, for example, a participant may control distribution of his mobile phone number. The broadcast information can then be used to facilitate integrating the participant into the session and initiating media connections of various types.

In certain embodiments, when a moderator or other participant in the session clicks a button or other joining acknowledgment, then participants are added to the session.

Figure 2:
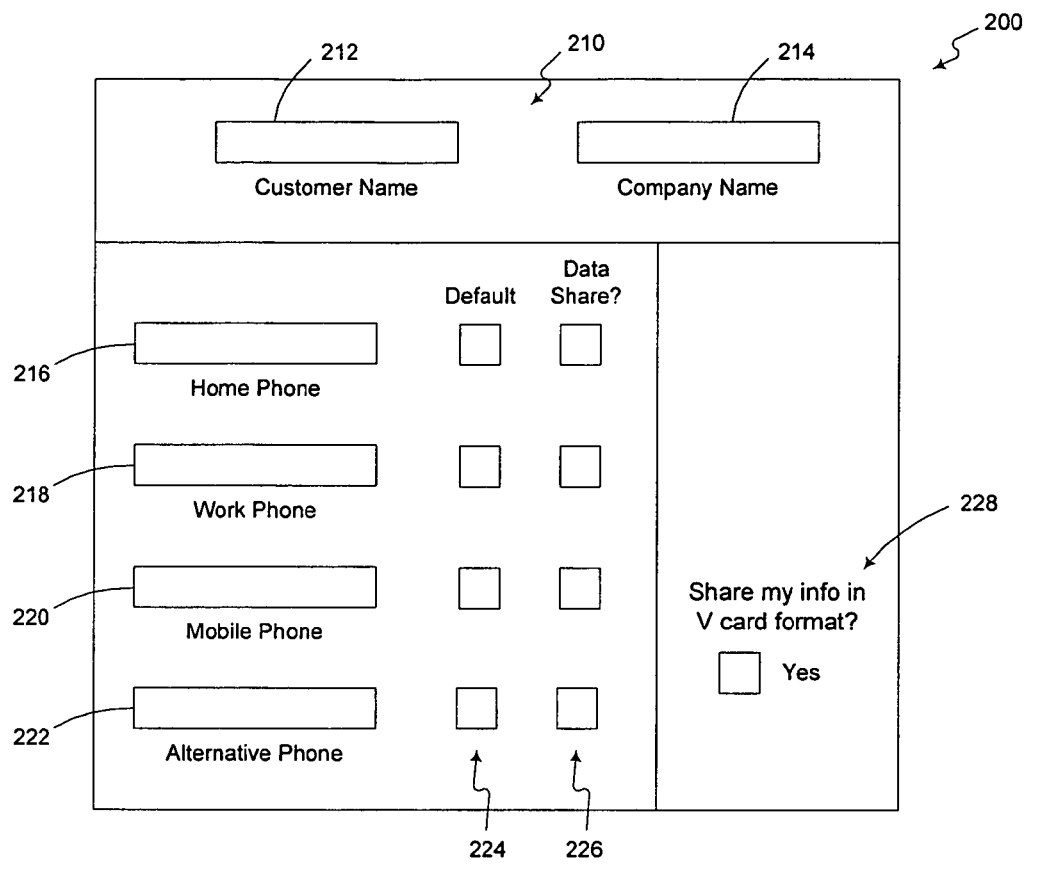

An exemplary embodiment of a profile or form that a participant can fill out in accordance with the systems and methods described herein is illustrated in FIG. 2. It can be appreciated that the fields discussed below with respect to the illustrated profile are merely exemplary in nature and that any information can be collected from participants for a particular conference session. The information requested from participants can vary based on the type of session as well as many other factors.

In one embodiment, a user can select a profile when first joining as a participant in a collaboration session. In another embodiment, several profile formats can be associated with a specific participant. Based on characteristics of the session, such as particular type of session or, who will be attending and/or what group is participating in the session, the participant can select the desired profile for purposes of that collaboration session. In one embodiment, the participant can identify a profile that would be a default profile.

Profile 200 of FIG. 2, which can be presented by means of a user interface on the participant's client device, can be designed to collect information from participants to then generate a profile that can be used by a collaboration system configured in accordance with the systems and methods described herein. In the illustrated embodiment, profile 200 includes an identification section 210. In this example, identification section 210 includes a customer name field 212 and a company name field 214. The customer name field 212 and the company name 214 can be configured to allow a participant to input the relevant identification information in the particular fields. In alternative embodiments, additional fields such as group name, title, project team, etc. can be included in the identification section 210. In alternative embodiments, any combination of those fields can be used.

Profile 200 can also include a home phone field 216, a work phone field 218, a mobile phone field 220 and an alternative phone field 222. In the illustrated embodiment, each of the phone fields 216, 218, 220 and 222 can be configured to receive information input by a participant, such as by typing. In alternative embodiments, the participant can use a drop down window next to each of the phone fields to designate the particular phone number being entered. For example, if a participant has two work phones, then the profile 200 can include a drop down window next to any of the other phone fields to allow a user to input two work phone numbers at which the participant can be contacted.

In one embodiment, the profile 200 includes a series of default checkboxes 224 that correspond to the phone fields. The default checkboxes enable a participant who is filling out profile 200 to select which of the phone numbers should be used as a default contact.

Profile 200 can also include a series of data share checkboxes 226 that are associated with the phone fields 216, 218, 220 and 222. The data share checkboxes 226 can be provided to enable a participant to elect whether particular phone numbers can be shared with different participants in a session. In alternative embodiments, there may be data share checkboxes associated with each field in profile 200. These checkboxes can, for example, allow the participant to select whether each piece of information added can be shared with other participants.

The sharing checkboxes described above simply indicate whether other participants in the collaborative session are allowed to view the selected information while the session is in progress. In one embodiment, profile 200 can also include an option for a participant, e.g. participant A, to allow other participants to save A's shared information in a more persistent manner, e.g. in a file on the other participant's client device. In the illustrated embodiment, the question or prompt "Share my info in Vcard format?" is posed to the participant in a checkbox 228, which allows the participant to select whether such sharing is permitted. In alternative embodiments, the format of profile 200, the input fields, and the checkboxes can have any configuration depending on the desires of the participants.

Client software on a client device can be configured to read the information that is entered by the participant in profile 200 and store the information on the client device. In one embodiment, the information can be stored or saved in a Vcard format. The Vcard format allows information to be readily exchanged between participants. It is similar to the common practice of handing out business cards to other participants in a face to face meeting.

An exemplary method of adding an audio participant to an existing conference or collaboration session is discussed below. While specific steps are discussed, it can be appreciated that in alternative embodiments any number of and any combination of steps can be used.

In a multimedia collaboration session, an audio conference can, for example, be initiated using an appropriate device or service, for example the public switched telephone network (PSTN). In alternative embodiments, any type of audio and/or video session can be initiated. A control mechanism can be configured to command the PSTN audio device or service to initiate calls to each participant at the appropriate phone numbers associated with the participants. This command can be in any particular type of format. The control mechanism can also be configured to automatically confirm that the correct participant answered at the number associated with that participant. In one embodiment, participants can be requested to acknowledge or confirm that they are the proper participant and/or that the session to which they are being added is correct.

Once confirmation of the correct participant is determined, that participant can be joined into the session. In an alternative embodiment, if the correct participant does not answer, then the control mechanism or system can attempt to contact the participant at alternate phone numbers or devices as specified by the participant, e.g., via a hierarchy or priority associated with endpoint address information obtained from the participant's client device.

In one embodiment, the control mechanism obtains contact information for each participant to be added to a session. In one embodiment, obtaining contact information includes the gathering or recalling at least one telephone number associated with each of the participants in the session. This gathering step can be accomplished by querying each participant's client device to obtain information that has been previously set up by the participant and stored on the client device. It will be appreciated that the collecting of information is not associated with the other steps discussed above for every conference session.

In one embodiment, the first person that tries to join a conference makes a request for a conference using some identification information, such as a conference identifier or ID. The conference ID can, for example, be a series of numbers or letters or some combination of both. The conference request or inquiry can be made using software loaded on the client device associated with the participant. The request travels from the end point of the first person to, e.g., a presence service at the relevant domain.

The request asks the presence service whether there is a conference that exists with that ID and if so, whether the conference is not full. The presence service searches for such a conference object with that conference ID, which would be located at a particular end point. Initially, if a conference ID has been assigned to a conference object, the conference object is found and in a state of rest until one participant joins. If no such conference object is found, then the request instructs the presence service to find a conference service and then create a conference object. Once the conference object has been created, other participants can join the conference object.

The conference object in its rest state allows participants to enter, but does not allow any communications between participants until the session is started. When the moderator joins the session, the moderator makes the request to start the session.

Every participant in a conference session sends a request that the presence service receives. Once one participant has been connected to a conference object, every participant thereafter receives a message back from the presence service identifying the address for the particular conference.

As discussed above, an end point address is any end point that can "talk" or "communicate." Any media type that has a different address can be referred to as an end point. In one example, an session initiation protocol (SIP) phone can be used as an end point. In this example, a gateway could be used with the SIP phone. This arrangement allows two communication devices to set up a session. The gateway translates between messages understood by the SIP phone and another network, for example, a message to invite a participant's phone to join the meeting. Other types of end points include a PSTN, a phone number and any other type of media component. An alternative end point is a voice over internet connection. Messages are typically sent to various end points to initiate a session.

As previously discussed, a conference can be started in response to a request from a participant that asks the conference services to find a conference service that is available and not full. The reply to such a request is the end point of a conference object. If no conference is available, then a conference object is created. The "I want to join" message or request can be sent with a set of phone numbers at which the participant can be contacted. These phone numbers are the same phone numbers from the profile created by the participant prior to joining the session. The conference object sends out the participant joining the message to the other participants.

In one embodiment, a link is highlighted to dial the particular participant. The link is active only for a moderator or the joining participant. In alternative embodiments, the link may be sent as part of the information to all participants informing that a new participant has requested to join the meeting. In this embodiment, participants are joined to an existing multimedia conference at a one at a time basis.

The present invention allows a person or participant to be dialed without having to input a telephone number every time. The automatic availability of information facilitates the joining of different participants to different conferences at any time in any fashion.

In one embodiment, a dial button can be included that lists the phone numbers that were supplied for a particular participant and in some cases may indicate whether a default phone number was provided. The message that is sent to the moderator has the option as to whether to click the dial button.

In an alternative embodiment, a control mechanism may allow a "blast dial" of all participants at the same time. A blast dial is when a control mechanism dials everybody that is not currently connected to the conference session, but who has indicated that they would like to join. The relevant endpoint addresses can be collected prior to or during the blast dial operation. Typically, a moderator could be the participant who initiates the blast dialing function.

While the description of the invention includes descriptions of different platforms in a collaboration system, or more of the platforms can be either co-located on a single system or device or located on different devices. Also, while the addition of an audio component to a session is the focus of the above description, it can be appreciated that the same concepts and principles apply to the addition of a video or an audio/video component to a session, or to any media type that may be desirable to include in a collaboration session An alternative embodiment of the present invention is now described. In this embodiment, when each participant joins the conference session, the participant supplies his or her contact information. The conference session may be a video conference, an audio conference, a data conference or a combination of any of those conferences.

The conference system then provides a mechanism by which each participant can "connect himself" into an "out of band" communication channel. An "out of band" communication channel is a communication channel that is outside of the channel on which conference messages and events are distributed among conference participants. One example is an audio conference where the audio data is carried over the switched telephone network.

In one implementation, when a participant joins the on-line conference, the participant supplies the telephone number of the phone at which the participant is to be dialed. The participant's client can extract default telephone number (s) from the participant's user profile (described previously), and allow the participant to accept the default(s), or enter a different telephone number for this conference. The online conferencing system then prompts the participant for a decision as to whether the participant wants the "out of band" conferencing system to dial him or her. For example, the conferencing system could cause a dialog box to open on the participant's screen. When the participant indicates yes, the conferencing system calls the participant at the appropriate telephone number.

Alternatively, the conferencing system could place a link or button on the participant's interface that would enable the participant to select the option of dial himself. In either arrangement, the conferencing system according to the present invention allows each participant to control the connection of that participant into the "out of band" channel. One benefit of the participant being able to do such action is to reduce the burden on the moderator. Another benefit is to increase the likelihood that participants are successfully connected.

The above-described embodiments and examples are applicable to any type of communication channel.

Figure 3:
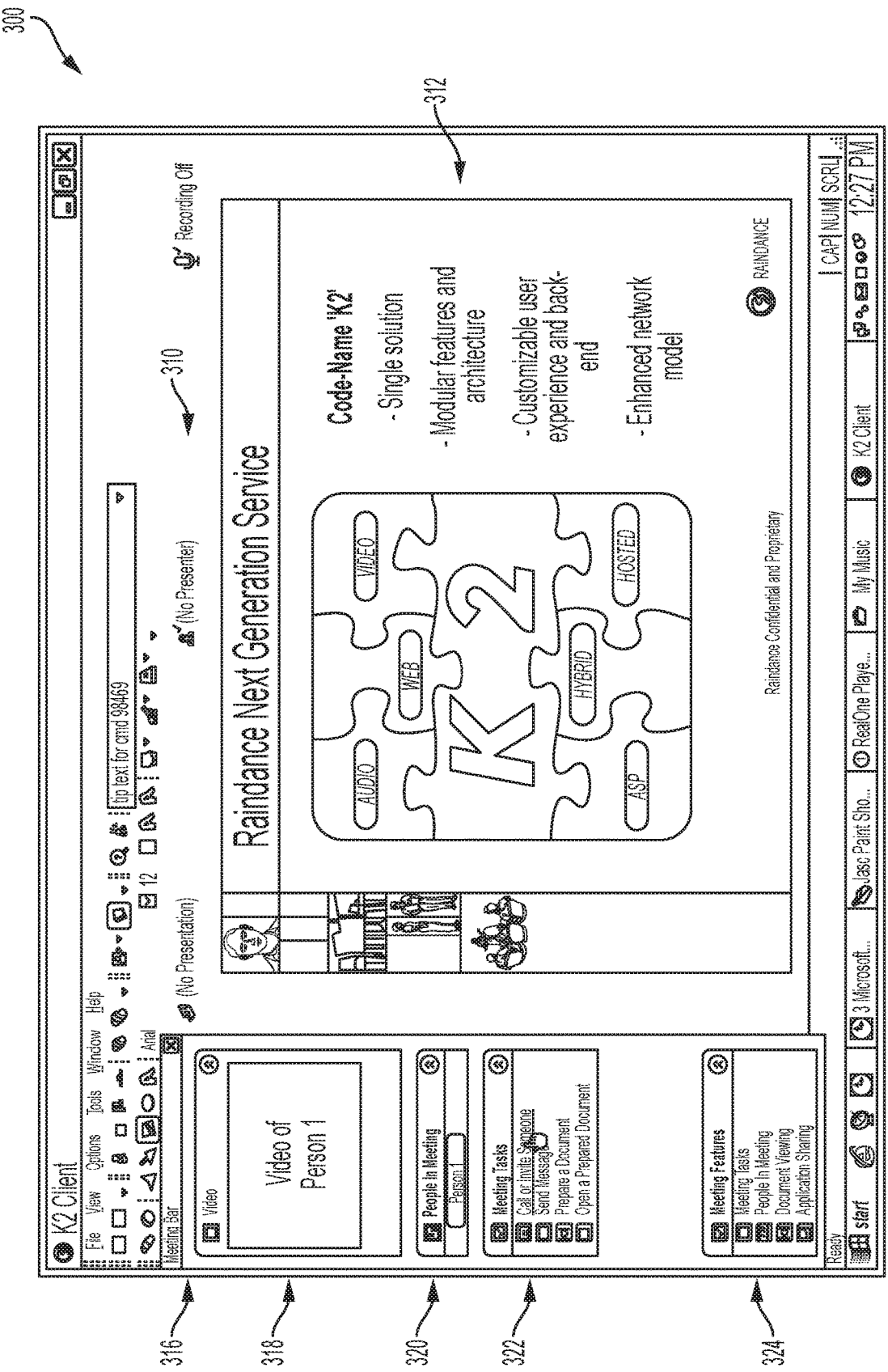
FIG. 3 is an exemplary screen shot according to the present invention.

An exemplary screen shot according to the present invention is illustrated in FIG. 3. The illustrated user interface 300 includes an identification section 310 that informs the viewer of the presentation being shown, in this example there is no presentation being shown, and the current presenter, which in this example is no one at this time. The user interface 300 also includes a current presentation section 312 in which a currently displayed document or media element is displayed.

In one embodiment, the user interface 300 includes a control section 316. Control section 316 can include any type and/or combination of control features. In the illustrated embodiment, the control section 316 includes a video section 318. The video section can include a live video feed of any participant in the session for which video information is being transmitted. In one example, the video feed for person 1, who has joined the session already, is shown.

The control section 316 can also include a "people in the meeting" section 320. This section 320 identifies who has joined the session. In this example, person 1 has joined the session. The control section 316 also includes a "meeting tasks" section 322. This section 322 has several activity links that can be chosen by a participant. The control section 316 can also include a "meeting features" section 324. This section 324 can include a variety of features, some of which are illustrated in FIG. 3.

Figure 4:
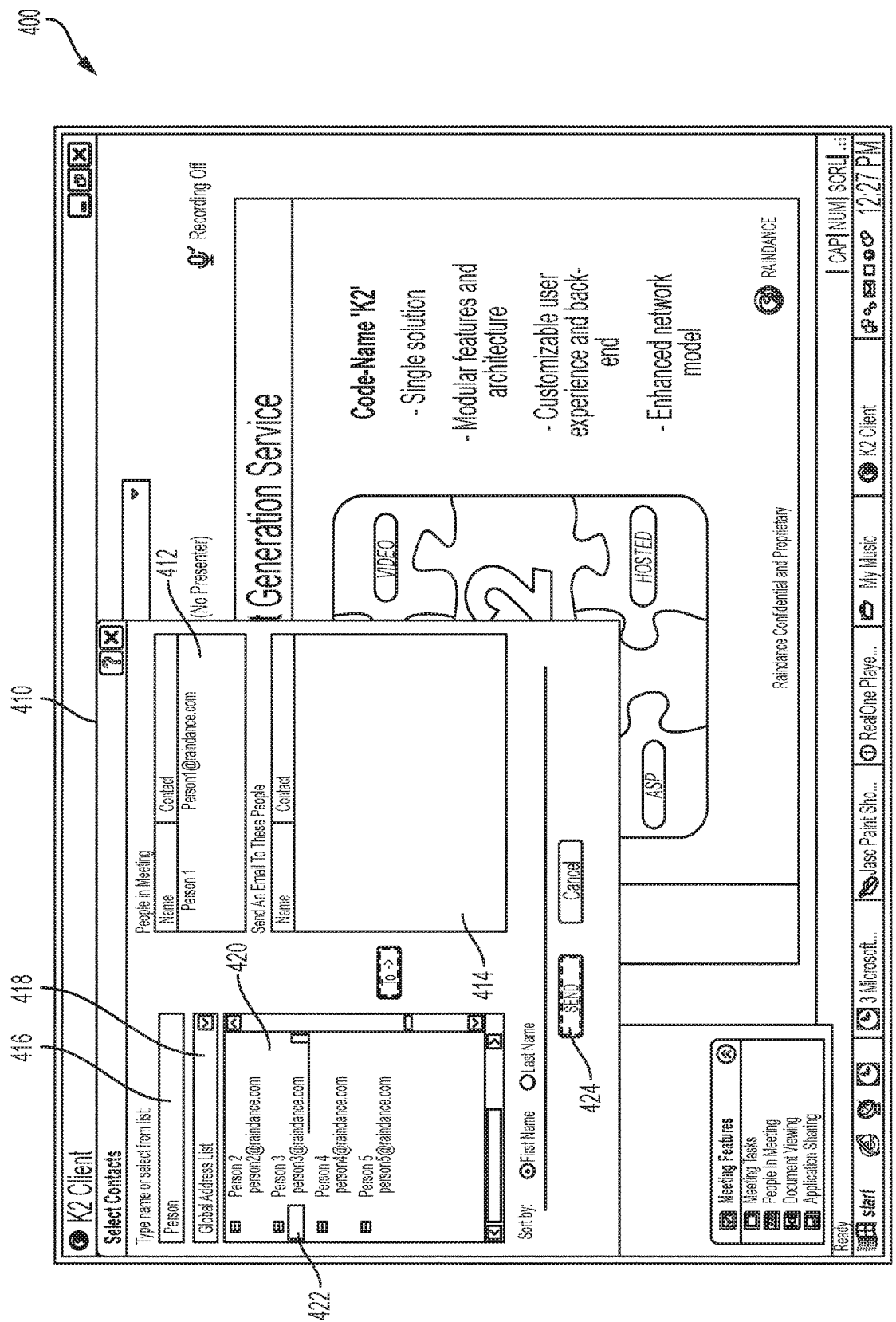
FIG. 4 is an exemplary screen shot according to the present invention.

Another exemplary embodiment of a user interface is illustrated in FIG. 4. User interface 400 includes a "Select Contacts" window 410. This window 410 includes a people in the meeting section that identifies which participants have joined and some of the joined participants contact information.

This window 410 also includes an input field 416 in which search information can be input to locate information for a particular person. The window 410 also includes a contact category drop down window 418 and a contact listing window 420 in which a person can be highlighted or selected.

The window 410 also includes an email recipient location 414 in which particular addressees can be moved from the contact list. A send button 424 is provided to enable an email to be sent.

Figure 5:
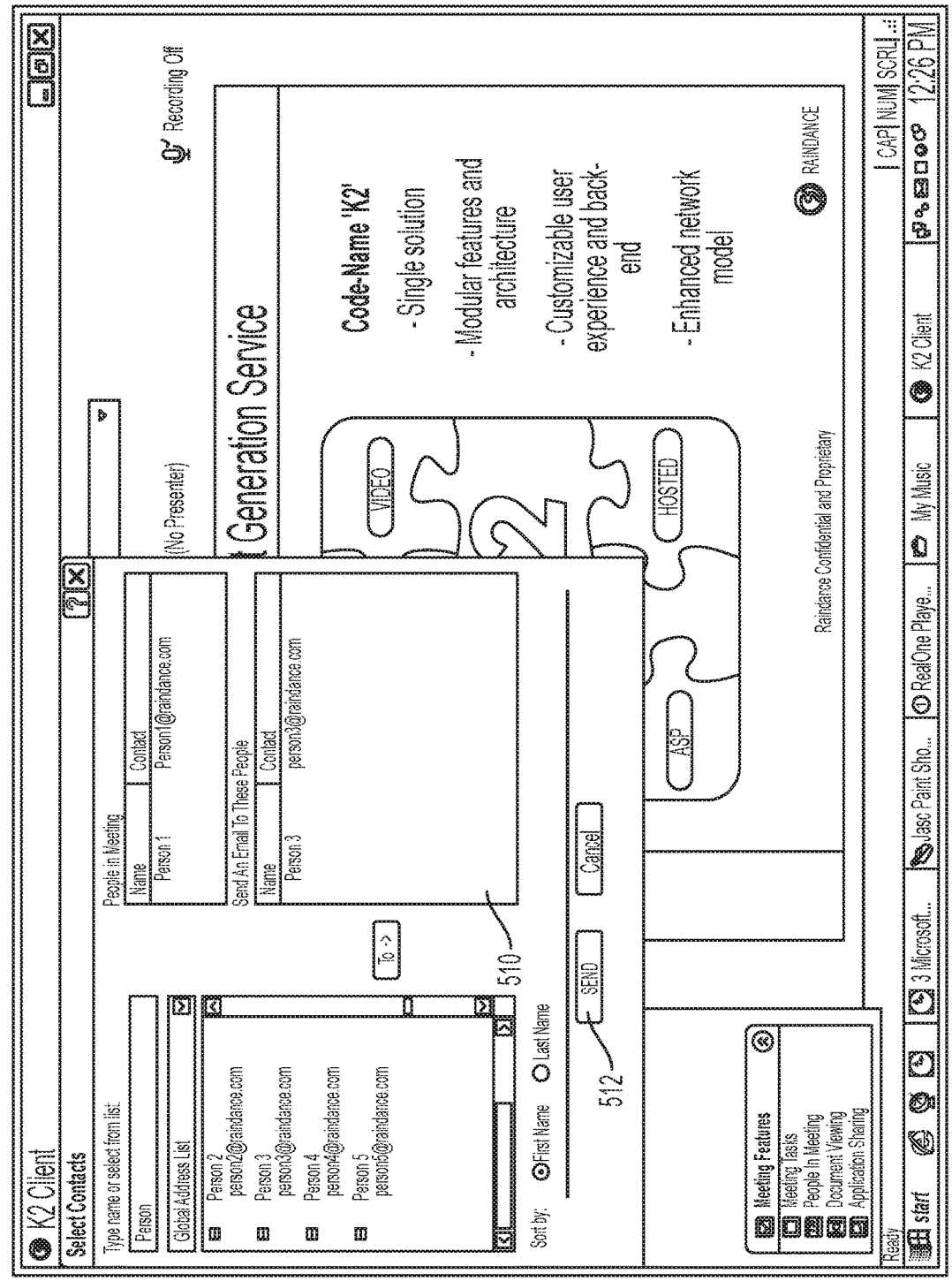
FIG. 5 is an exemplary screen shot according to the present invention.

In FIG. 5, the user interface 500 shows how the contact information person 3, who was selected in the window 410 in FIG. 4, is moved to the email addressee window 510. The participant can select the send button 512.

Figure 6:
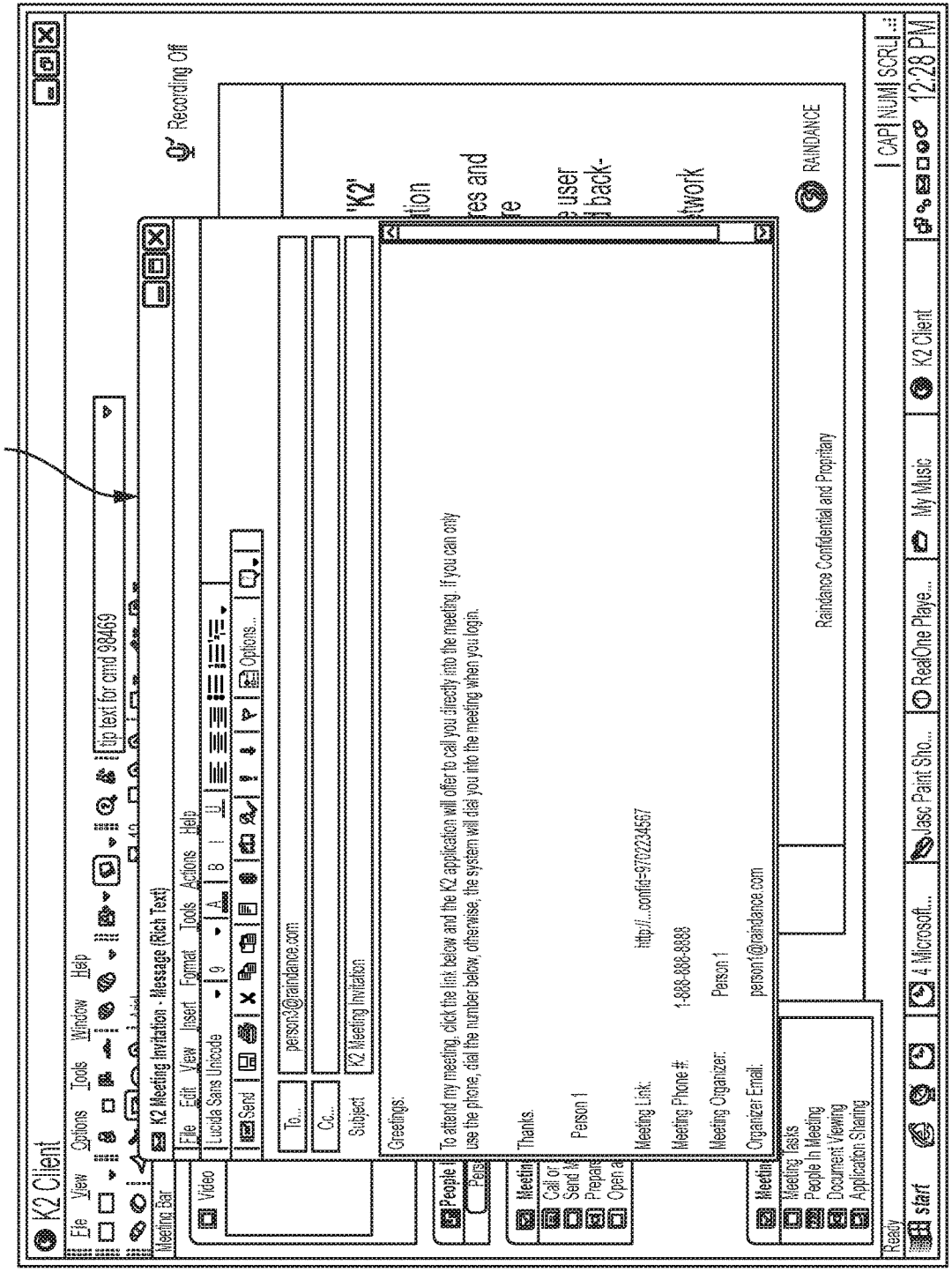
FIG. 6 is an exemplary screen shot according to the present invention.

In FIG. 6, the user interface 600 shows a pop-up email window 610 in which an invitation to join a collaboration session is provided. The meeting organizer and the meeting specific information is automatically included in the email. In an alternative embodiment, the meeting specific information is manually entered.

Figure 7:
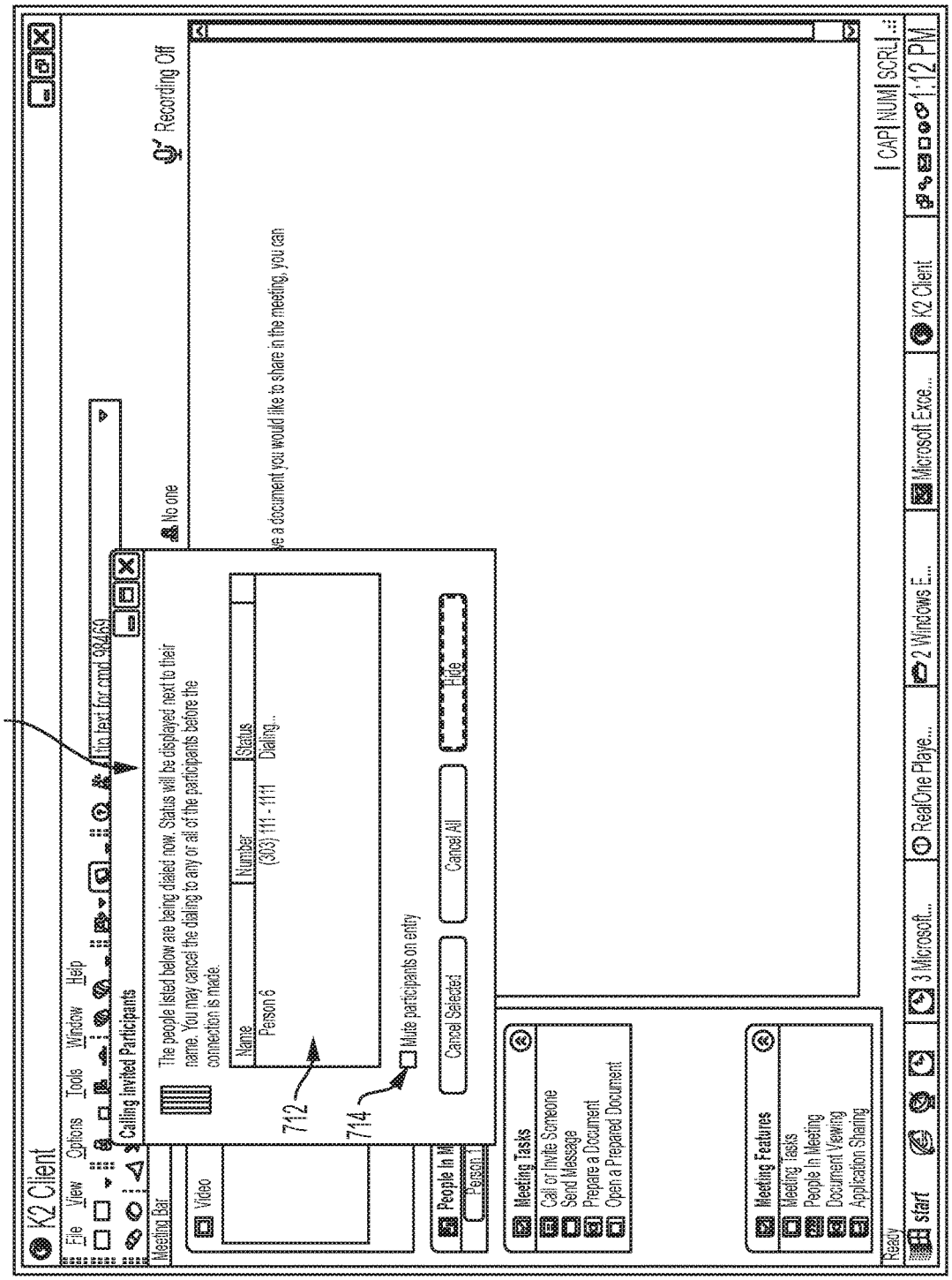
FIG. 7 is an exemplary screen shot according to the present invention.

In FIG. 7, the user interface 700 shows a "calling invited participants" window 710. This window 710 includes information relating to the participant being contacted. In this example, the name, the number and the status of the call are shown. In other examples, any combination of information relating to the participant being called is shown. This window 710 also includes an option box 714 that can be selected to mute participants on entry.

Figure 8:
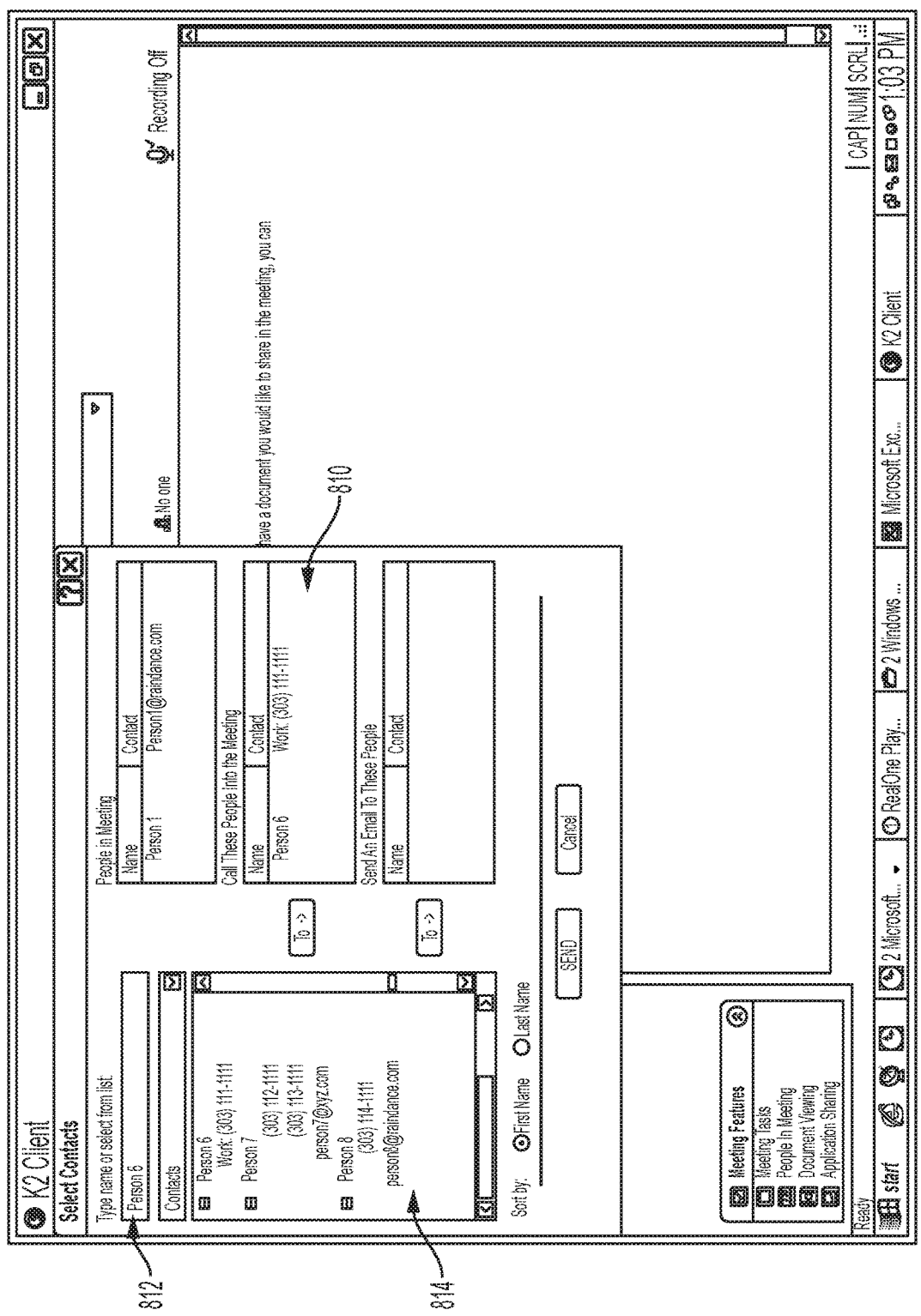
FIG. 8 is an exemplary screen shot according to the present invention.

In FIG. 8, user interface 800 illustrates a window that includes a section 810 in which particular persons can be added in order to be called into a session. Information put in the input field 812 is used to select the particular person in the addressee window 814. The information for this person, when selected, is moved to window 810.

In alternative embodiments, any combination of features and arrangement of components can be provided on the user interfaces in accordance with the present invention.

While certain embodiments of the inventions have been described above, it will be understood that the embodiments described are by way of example only. Accordingly, the inventions should not be limited based on the described embodiments. Thus, the scope of the inventions described herein should only be limited in light of the claims that follow when taken in conjunction with the above description and accompanying drawings.

What is claimed is:

1. A multimedia collaboration system, comprising: a plurality of client devices in a computer-implemented network, each client device associated with a participant, of a plurality of participants, and having a corresponding endpoint address; and a server configured to: select endpoint address corresponding to a client device, of the plurality of client devices, in response to a request identifying the client device to join a multimedia collaboration session; and attempt to connect to at least one client device, of the plurality of client devices, based on a priority of an endpoint address of the at least one client device obtain information associated with the endpoint address of the at least one client device simultaneous with the attempt to connect to the at least one client device and the corresponding endpoint address, and wherein a live document of a set of elements presented during the multimedia collaboration session is dynamically formed from a listing of presented materials for at least one of the plurality of participants.

2. The multimedia collaboration system of claim 1, wherein the multimedia collaboration session comprises a plurality of media components, and wherein the endpoint address information is used to add a new media component to the multimedia collaboration session.

3. The multimedia collaboration system of claim 2, wherein the new media component is an audio conferencing component.

4. The multimedia collaboration system of claim 3, wherein the addition of the audio conferencing component includes the addition of telephonic conferencing via a telephonic network.

5. The multimedia collaboration system of claim 4, wherein the multimedia collaboration session occurs over one network and the added media component is associated with a second network.

6. The multimedia collaboration system of claim 5, wherein the two networks use separate access devices.

7. The multimedia collaboration system of claim 5, wherein the two networks use different addressing schemes.

8. The multimedia collaboration system of claim 4, wherein the multimedia collaboration session occurs over a network that is separate from the telephonic network.

9. The multimedia collaboration system of claim 2, wherein the multimedia collaboration system further facilitates the addition of a new media component to the collaboration session by automatically storing the endpoint address information for each of the plurality of participants as each participant joins the multimedia collaboration session.

10. The multimedia collaboration system of claim 2, wherein the multimedia collaboration system further facilitates the addition of a new media component to the multimedia collaboration session upon receipt of a query from a new participant.

11. The multimedia collaboration system of claim 2, wherein the multimedia collaboration system facilitates the addition of a new media component to the multimedia collaboration session upon receipt of a query from an existing participant.

12. The multimedia collaboration system of claim 1, wherein the endpoint address information includes a list of addresses for the associated participant.

13. The multimedia collaboration system of claim 12, wherein the multimedia collaboration system further automatically attempts to connect via each of addresses in the list of addresses until it achieves a successful connection.

14. The multimedia collaboration system of claim 13, wherein the endpoint address information includes multiple phone numbers for the associated participant.

15. The multimedia collaboration system of claim 12, wherein the list of addresses corresponds to multiple client devices.

16. The multimedia collaboration system of claim 1, wherein the endpoint address information for each participant comprises endpoint address information for a plurality of endpoints.

17. The multimedia collaboration system of claim 16, wherein priority can be assigned to the plurality of endpoints for each participant.

18. The multimedia collaboration system of claim 16, wherein a hierarchy can be assigned to the plurality of endpoints for each participant.

19. The multimedia collaboration system of claim 1, wherein the endpoint address is any endpoint that can communicate including a website, a session initiation protocol telephone, a telephone, a cellular telephone, a personal digital assistant, and any other type of media component that can communicate.

20. The multimedia collaboration system of claim 1, wherein the endpoint address information comprises a telephone number.

* * * * *